US008191508B2

(12) United States Patent
Greenwood et al.

(10) Patent No.: US 8,191,508 B2
(45) Date of Patent: Jun. 5, 2012

(54) WILD BIRD FEEDER

(75) Inventors: Mark Greenwood, Arlington Heights, IL (US); Larry Sternal, Bartlett, IL (US); Robert Krause, Barrington Hills, IL (US)

(73) Assignee: Pets International, Ltd., Elk Grove Village, IL (US)

( * ) Notice: Subject to any disclaimer, the term of this patent is extended or adjusted under 35 U.S.C. 154(b) by 1005 days.

(21) Appl. No.: 12/006,569

(22) Filed: Jan. 3, 2008

(65) Prior Publication Data

US 2008/0156269 A1 Jul. 3, 2008

Related U.S. Application Data

(60) Provisional application No. 60/878,241, filed on Jan. 3, 2007.

(51) Int. Cl.
*A01K 61/02* (2006.01)
(52) U.S. Cl. ...................................... 119/52.2; 119/57.8
(58) Field of Classification Search .................. 119/52.1, 119/52.2, 57.8, 72, 74
See application file for complete search history.

(56) References Cited

U.S. PATENT DOCUMENTS

| 1,772,673 | A | * | 8/1930 | MacDonald | ..................... 24/713 |
| D165,628 | S | | 1/1952 | Blazier | |
| 2,696,803 | A | * | 12/1954 | Deffenbaugh | ............... 119/52.2 |
| 2,866,435 | A | | 12/1958 | Blazier | |
| 3,244,150 | A | | 4/1966 | Blair | |
| 3,399,650 | A | | 9/1968 | Goodman | |
| 3,977,363 | A | * | 8/1976 | Fisher, Jr. | .................... 119/52.3 |
| D278,166 | S | | 3/1985 | Kilham | |
| 4,732,112 | A | | 3/1988 | Fenner et al. | |
| D299,770 | S | | 2/1989 | Coffer | |
| D343,030 | S | | 1/1994 | Harwick, Jr. | |
| D351,262 | S | | 10/1994 | Fasino | |
| 5,361,723 | A | | 11/1994 | Burleigh | |
| 5,558,040 | A | | 9/1996 | Colwell et al. | |
| 5,791,286 | A | * | 8/1998 | Taussig et al. | ............... 119/52.3 |
| 5,975,015 | A | * | 11/1999 | Runyon et al. | ............... 119/52.1 |
| 6,047,661 | A | | 4/2000 | Lush | |
| 6,067,934 | A | | 5/2000 | Harwich | |
| 6,073,582 | A | | 6/2000 | Lush | |
| 6,269,769 | B1 | | 8/2001 | Wenstrand | |
| 6,427,629 | B1 | | 8/2002 | Lush | |
| 6,439,158 | B1 | | 8/2002 | Blohm | |
| 6,532,896 | B1 | | 3/2003 | Hurlbert | |

(Continued)

*Primary Examiner* — Kimberly Berona
(74) *Attorney, Agent, or Firm* — Knechtel, Demeur & Samlan

(57) ABSTRACT

A wild bird feeder comprising a container and a base. A cable extends through the container and the base and is provided with a hanging loop at one end and a bottom cover at the other end for retaining the components of the bird feeder between them and suspending the bird feeder in a hanging position when hung from a tree or otherwise. The container comprises and is formed by a cover, a dome, a collar, and a hopper. The cover is provided with a star shaped opening that frictionally engages with the hanging cable for enabling the separation of the cover from the dome to fill the bird feeder when the bird feeder is in the hanging position. The collar comprises a plurality of divider walls for creating a plurality of sections to direct the bird feed when filling the bird feeder. The hopper comprises a vertical column having a plurality of ports. The base comprises a tray having a conical shaped cone that is centrally located within the vertical column for directing the bird seed out the plurality of ports. The hopper is releasably attached or fastened to the base for enabling cleaning of the bird feeder in either the hanging or non-hanging position. A perch ring is provided on the base to support the birds when feeding.

7 Claims, 4 Drawing Sheets

U.S. PATENT DOCUMENTS

| | | |
|---|---|---|
| D483,529 S | 12/2003 | Fort, II |
| 6,679,197 B1 | 1/2004 | Reilly |
| 6,866,004 B1 | 3/2005 | Lush |
| 6,877,459 B2 | 4/2005 | Ruff |
| 6,901,882 B2 * | 6/2005 | Kuelbs .................. 119/452 |
| 7,032,538 B1 | 4/2006 | Lush |
| 7,040,251 B2 | 5/2006 | Fort, II |
| 7,096,821 B2 | 8/2006 | Ruff |
| 7,131,395 B1 | 11/2006 | Lush |
| 2003/0197013 A1 | 10/2003 | Conti et al. |
| 2005/0005865 A1 * | 1/2005 | Rich et al. ................ 119/52.2 |
| 2006/0107900 A1 * | 5/2006 | Bescherer ................ 119/57.8 |
| 2006/0201062 A1 | 9/2006 | Ruff |
| 2006/0207512 A1 | 9/2006 | Fort, II |
| 2006/0272585 A1 * | 12/2006 | O'Dell .................... 119/57.8 |
| 2006/0288944 A1 | 12/2006 | Hoff |
| 2008/0029035 A1 * | 2/2008 | Gou ........................ 119/52.2 |

* cited by examiner

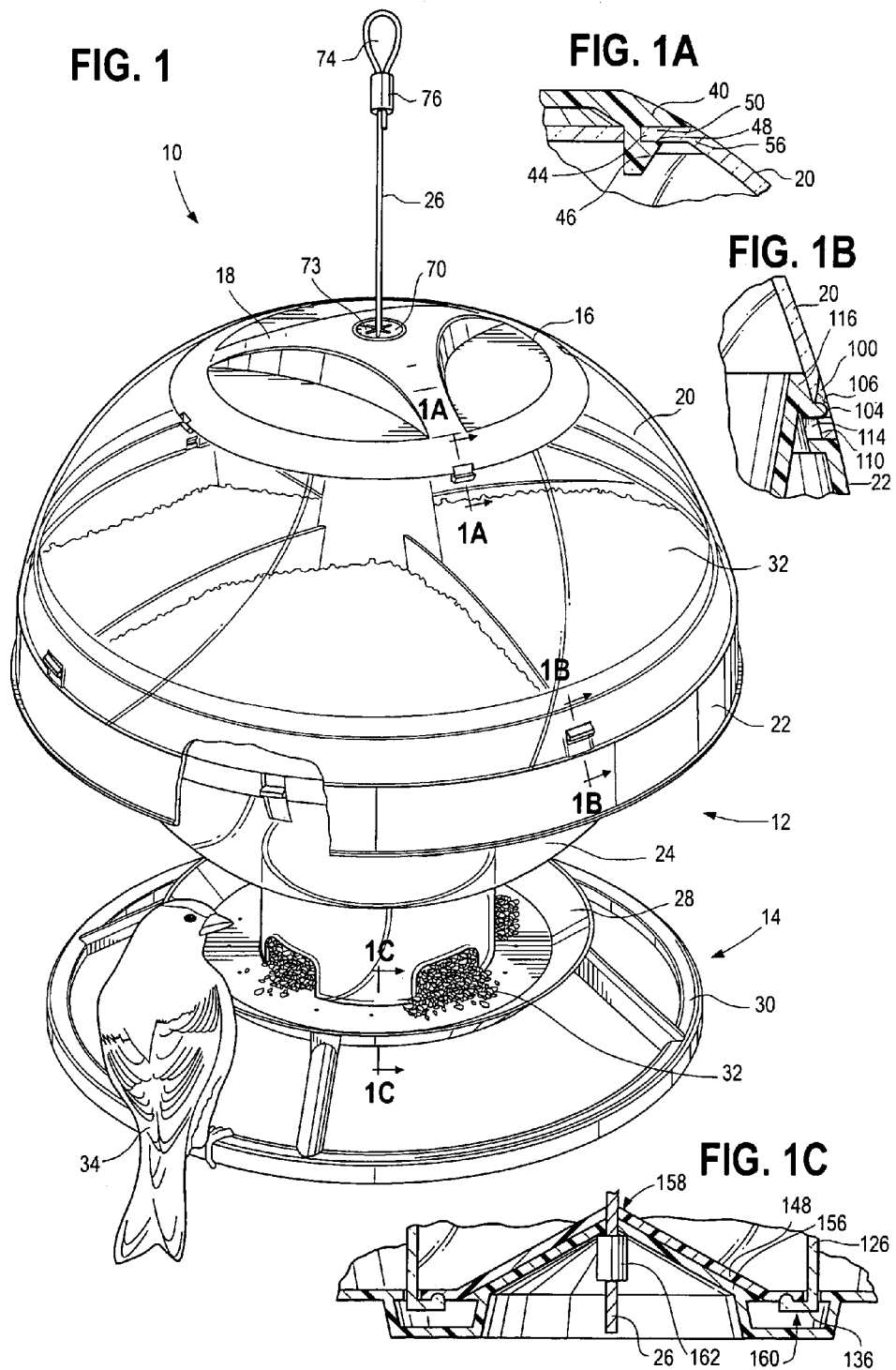

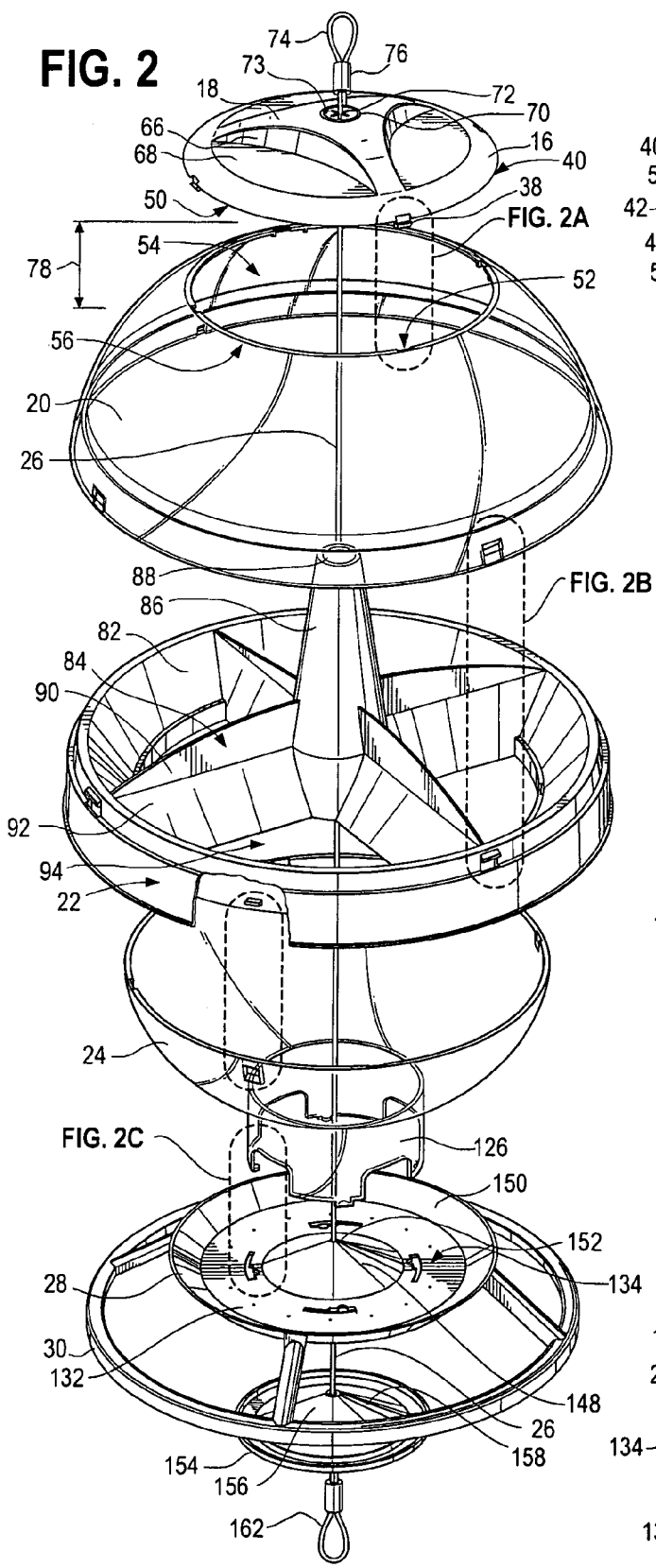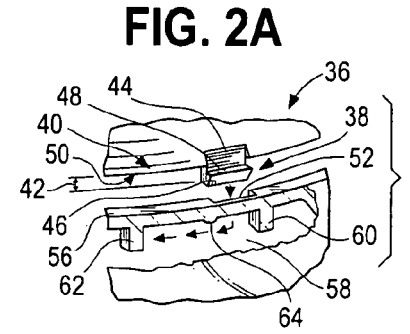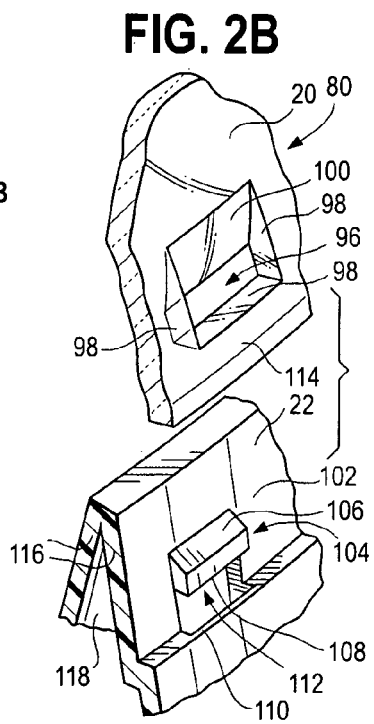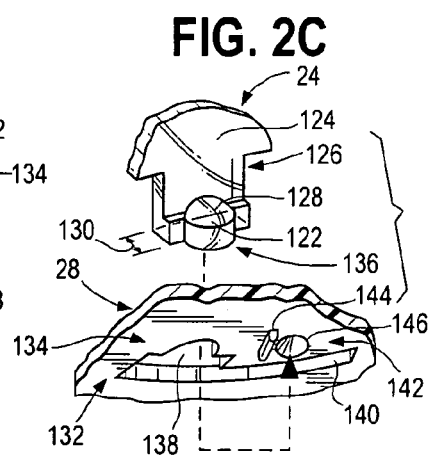

WILD BIRD FEEDER

I. CROSS-REFERENCE TO RELATED APPLICATION

This patent application is a non-provisional application claiming priority from U.S. Provisional Patent Application Ser. No. 60/878,241, entitled "Thistle Bird Feeder and Wild Bird Feeder," filed on Jan. 3, 2007, and is fully incorporated herein by reference.

II. FIELD OF THE INVENTION

The present invention relates to bird feeders and, more particularly, to a wild bird feeder designed and developed to make the feeding of birds easier, cleaner, and more useful to the caretaker.

III. DESCRIPTION OF THE PRIOR ART

Wild bird feeders have been around for a long time and are known in the art. These types of feeders are typically used with larger seeds such as, for example, seed blends or mixes, sunflower seeds, etc. . . . The seeds are generally poured into and housed in a compartment where they are made available to birds through some form of opening or port. The wild bird feeder is then hung for ease of access by the birds.

One of the problems with these type of feeders is that when the bird feeder becomes empty, the bird feeder must be retrieved from where it is hanging, necessary components or parts opened or removed to obtain access to the compartment housing the seeds, replenishing the seeds into the compartment, closing or reassembling the components or parts of the bird feeder, and then re-hanging the bird feeder. This process of re-filling the bird feeder is cumbersome and not convenient. Another problem is that when it comes to cleaning the bird feeder, the same cumbersome and inconvenient process is required. Applicant has, however, designed a wild bird feeder that solves these problems and provides other useful benefits. Thus, there is a need and there has never been disclosed Applicant's unique wild bird feeder.

IV. SUMMARY OF THE INVENTION

The present invention is a wild bird feeder comprising a container and a base. A cable extends through the container and the base and is provided with a hanging loop at one end and a bottom cover at the other end for retaining the components of the bird feeder between them and suspending the bird feeder in a hanging position when hung from a tree or otherwise. The container comprises and is formed by a cover, a dome, a collar, and a hopper. The cover is provided with a star shaped opening that frictionally engages with the hanging cable for enabling the separation of the cover from the dome to fill the bird feeder when the bird feeder is in the hanging position. The collar comprises a plurality of divider walls for creating a plurality of sections to direct the bird feed when filling the bird feeder. The hopper comprises a vertical column having a plurality of ports. The base comprises a tray having a conical shaped cone that is centrally located within the vertical column for directing the bird seed out the plurality of ports. The hopper is releaseably attached or fastened to the base for enabling cleaning of the bird feeder in either the hanging or non-hanging position. A perch ring is provided on the base to support the birds when feeding.

V. BRIEF DESCRIPTION OF THE DRAWINGS

The Description of the Preferred Embodiment will be better understood with reference to the following figures:

FIG. 1 is a perspective view of Applicant's wild bird feeder in its assembled form and further illustrating the bird feeder completely filled with seed and dispensing the seed for access by a perching bird.

FIG. 1A is a cross-sectional view, taken along line 1A-1A of FIG. 1, illustrating the locking means for releaseably attaching or fastening the cover to the dome.

FIG. 1B is a cross-sectional view, taken along line 1B-1B of FIG. 1, illustrating the fastening means for releaseably attaching or fastening the dome to the collar.

FIG. 1C is a cross-sectional view, taken along line 1C-1C of FIG. 1, illustrating the coupling means for releaseably attaching or fastening the hopper to the tray.

FIG. 2 is an exploded perspective view of the wild bird feeder and, in particular, illustrating the various components used for forming the assembled device.

FIG. 2A is a perspective view of the locking means for releaseably attaching or fastening the cover to the dome.

FIG. 2B is an exploded perspective view of the fastening means for releaseably attaching or fastening the dome to the collar.

FIG. 2C is an exploded perspective view of the coupling means for releaseably attaching or fastening the hopper to the tray.

VI. DETAILED DESCRIPTION OF THE PREFERRED EMBODIMENT

Figure 3:
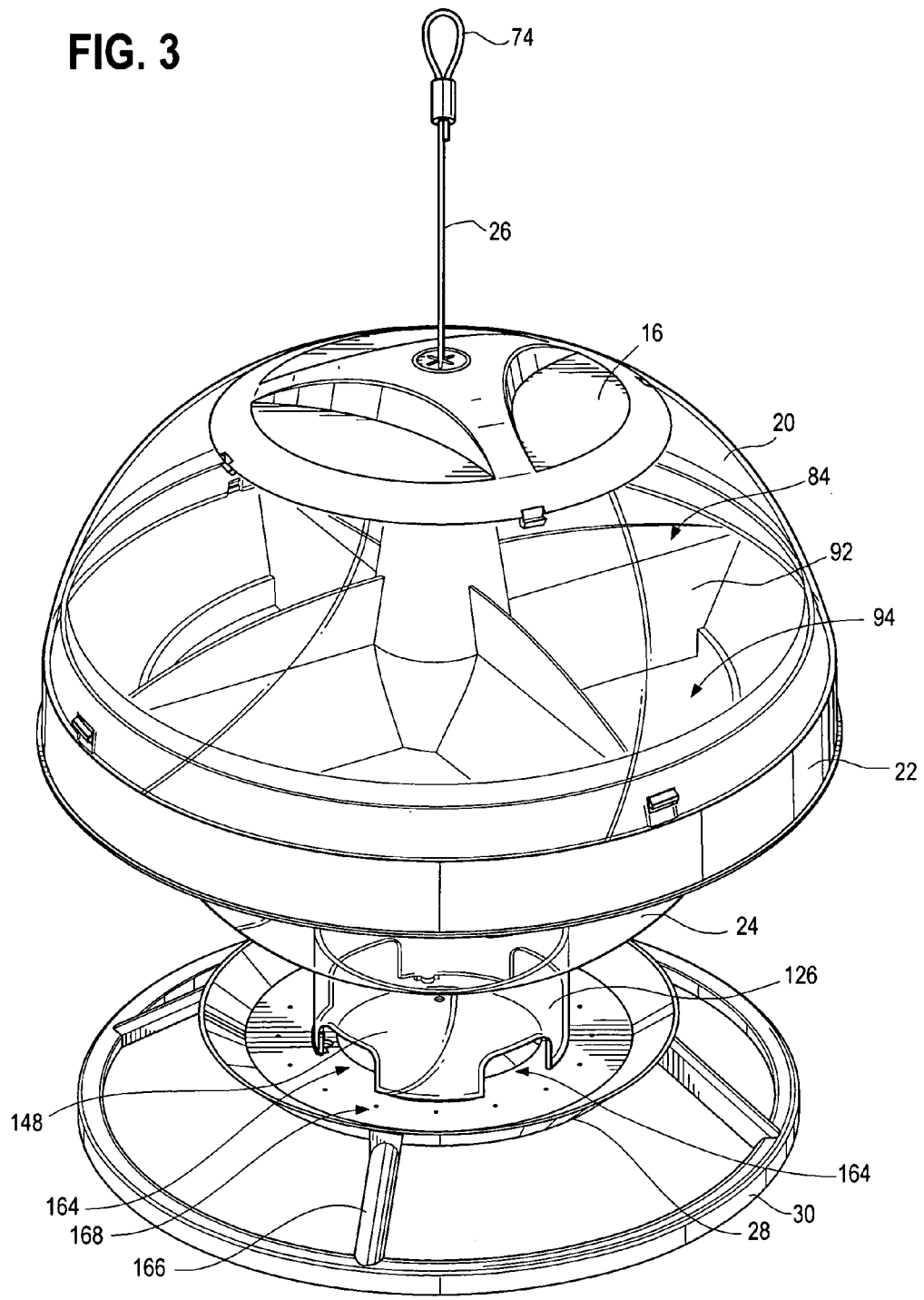
FIG. 3 is a perspective view of the wild bird feeder in its assembled form and further illustrating the bird feeder completely empty.

Turning to FIG. 1, Applicant's wild bird feeder 10 is illustrated. The wild bird feeder 10 comprises a container 12 and a base 14 (collectively referred to as "housing"), and a hanging cable 26. In the preferred embodiment, the container 12 comprises a cover 16 having a raised cap 18, a dome 20, a collar 22, and a hopper 24. The base 14 comprises a tray 28 and a perch ring 30.

As illustrated, the bird feeder 10 is filled with bird seed 32 which includes but is not limited to various seed blends or mixes, sunflower seeds, or any other type of desired bird seed. This seed is made available to birds 34 standing on the perch ring 30 or, alternatively, directly on the tray 28.

Turning to FIG. 2, the components of the bird feeder 10 and the assembly of these components are more clearly illustrated. In the preferred embodiment, the cover 16 is releaseably attached or fastened to the dome 20 using a locking means 36, as illustrated in FIG. 2A. The locking means 36 comprises a latch 38 integrally molded with the exterior edge 40 of the cover 16. The latch 38 comprises a recessed wall 44 and a ledge 46 extending outwardly and perpendicular from the recessed wall 44. In the preferred embodiment, the ledge 46 is located on the recessed wall 44 a distance 42 below the exterior edge 40. In this manner, the ledge 46 provides a top surface 48 that is adjacent and parallel to a bottom surface 50 provided by the exterior edge 40 (see also FIG. 1A). In the preferred embodiment, the dome 20 comprises an open top 54 having a rim 56. Situated within the rim 56 is a latch hole 52 providing access to a chamber 58 having opposed sidewalls 60 and 62.

To use the locking means 36, the ledge 46 of the latch 38 is inserted through the latch hole 52 and into the chamber 58. The ledge 46 is then moved in the direction of arrow A toward sidewall 62. The sidewall 62 acts as a stopping means for preventing the ledge 46 from moving any further within the chamber 58. As the ledge 46 is moved in the direction of arrow A, the ledge 46 encounters a detent member 64 which requires additional pressure to force the ledge 46 past the detent member 64 to reach the sidewall 62 and a locked position. When the ledge 46 reaches the sidewall 62, the sidewall 62 and the detent member 64 coact to prevent the ledge 46 from being easily or accidentally bumped or pushed in either direction from this locked position. Also, while the ledge 46 is in the chamber 58 and moving toward the locked position, the bottom surface 50 of the exterior edge 40, the recessed wall 44 of the latch 38, and the top surface 48 of the ledge 46 collectively become engagingly mated with the rim 56 (see FIG. 1A) for completing the locking means 36 and achieving a secure, waterproof seal and fit between the cover 16 and the dome 20. This locking means 36 is also designed to prevent the undesired rotation of the cover 16 in relation to the dome 20. When the locking means 36 is desired to be released, the reverse procedure is followed. The sidewall 60 then acts as the stopping mechanism to stop the movement of the ledge 46 within the chamber 58 for alignment in tandem with the latch hole 52 for removal of the ledge 46 back through the latch hole 52 and releasing the cover 16 from the dome 20.

In the preferred embodiment, this locking means 36 is used in four equally spaced locations around the perimeter of the cover 16 and the dome 20 for achieving the most efficient and secure attachment of the cover 16 to the dome 20. Alternatively, it is contemplated that any number of locking means 36 may be used by one skilled in the art.

To assist in the handling and movement of the cover 16, the raised cap 18 is used. The raised cap 18 comprises a plurality of finger walls 66. The finger walls 66 preferably extend upwardly in a substantially vertical or perpendicular relationship to the cover 16. In this manner, a clearing 68 is created between the finger walls 66 and the cover 16 enabling one to engage the finger walls 66 to manipulate the raised cap 18 for moving or laterally turning the cover 16. In the preferred embodiment, the engagement of the raised cap 18 and finger walls 66 is accomplished by a person using different fingers to apply inward pressure on one or more of the finger walls 66. This pressure enables the person to grasp the raised cap 18 and move or laterally turn the cover 16. Alternatively, the engagement and manipulation of the raised cap 18 may be accomplished by any other means known to one skilled in the art.

In the preferred embodiment, the raised cap 18 is also provided with a star shaped opening 70 having a center 72 surrounded by a plurality of slits 73 forming a plurality of adjacent teeth. Penetrating through the center 72 of the star shaped opening 70 is the hanging cable 26. The hanging cable 26 then terminates in a hanging loop 74 formed or created by the folding of the hanging cable 26 and which is secured by a locking crimp 76. The hanging loop 74 is then used to freely hang the bird feeder 10 from any desired location.

When the cover 16 is released from the dome 20, as illustrated, the cover 16 can be raised or elevated anywhere along the hanging cable 26 up to and adjacent the locking crimp 76 of the hanging loop 74. This creates a separation distance 78 from the dome 20. As the cover 16 is being raised or elevated, the force being applied on the cover 16 to raise or elevate the cover 16 is sufficient to overcome the frictional engagement between the hanging cable 26 and the star shaped opening 70 within the cover 16. When the cover 16 reaches a desired position along the hanging cable 26, the frictional engagement between the hanging cable 26 and star shaped opening 70 is sufficient to overcome the gravitational pull on the cover 16 and thereby freely retain the cover 16 in that desired position on the hanging cable 26. In this manner, the separation distance 78 created between the cover 16 and the dome 20 enables the bird seed 32 to be poured into the open top 54 of the dome 20 for filling or re-filling the bird feeder 10. This process is preferably accomplished while the bird feeder 10 is being hung. Alternatively, this process may be accomplished after the bird feeder 10 has been retrieved from the location that it is being hung. When the process is reversed and the cover 16 is lowered along the hanging cable 26 and reattached to the dome 20, the cover 16 and dome 20 again unite to provide a waterproof seal for protecting the bird seeds 32 from the elements.

At the other end of the dome 20, the dome 20 is releaseably attached or fastened to the collar 22 using a fastening means 80, as illustrated in FIG. 2B. In the preferred embodiment, the dome 20 comprises a recessed hole 96 surrounded by a sloping wall 100 and sidewalls 98. The collar 22 preferably comprises an outer surface 102 having an outwardly extending ledge 104 and an adjacent brim 110. The ledge 104 comprises a tapered top surface 106 and a flat bottom surface 108 which is positioned parallel and opposed to the brim 110. Situated between the flat bottom surface 108 of the ledge 104 and the brim 110 is a hole 112.

To use the fastening means 80, the dome 20 is slid over the outer surface 102 of the collar 22 until the recessed hole 96 is positioned above the ledge 104. When this occurs, the dome 20 is pressed against the outer surface 102 of the collar 22 until the ledge 104 is penetrated through the recessed hole 96. The sidewalls 98 likewise become frictionally engaged with the sides of the ledge 104. At the same time, a portion 114 of the dome 20 is frictionally received and held between the flat bottom surface 108 of the ledge 104 and the brim 110 for completing the fastening means 80 and achieving a secure, waterproof seal and fit between the dome 20 and the collar 22. A cross-section of this attachment is illustrated in FIG. 1B. This fastening means 80 is also designed to prevent the undesired rotation or movement of the dome 20 in relation to the collar 22.

When the fastening means 80 is desired to be released, depressing upon the tapered top surface 106 of the ledge 104 will force the outer surface 102 to push away from the dome 20 and the ledge 104 to push away from the recessed hole 96 for releasing the ledge 104 from the recessed hole 96. As this occurs, the portion 114 of the dome 20 simultaneously becomes released from the frictional engagement between the flat bottom surface 108 of the ledge 104 and the brim 110. In the preferred embodiment, the depression can be caused by a person's finger, a screw-driver, or any other means known to one skilled in the art. Additionally, the sloping wall 100 is designed to slope inwardly toward the tapered top surface 106 of the ledge 104. In this manner, the sloping wall 100 permits easier access to the ledge 104 and directionally guides any depression means directly to the ledge 104. To accommodate the depression movement of the outer surface 102 and the ledge 104 to push away from the dome 20, the collar 22 is provided with a V-shaped internal wall 116 that provides a spacing cushion 118 to account for and enable this movement. Once completed, the dome 20 is released from the collar 22.

In the preferred embodiment, this fastening means 80 is used in four equally spaced locations around the perimeter of the dome 20 and collar 22 for achieving the most efficient and secure attachment of the dome 20 to the collar 22. Alternatively, it is contemplated that any number of fastening means 80 may be used by one skilled in the art. The collar 22 is also releaseably attached or fastened to the hopper 24 using the same fastening means 80.

Figure 4:
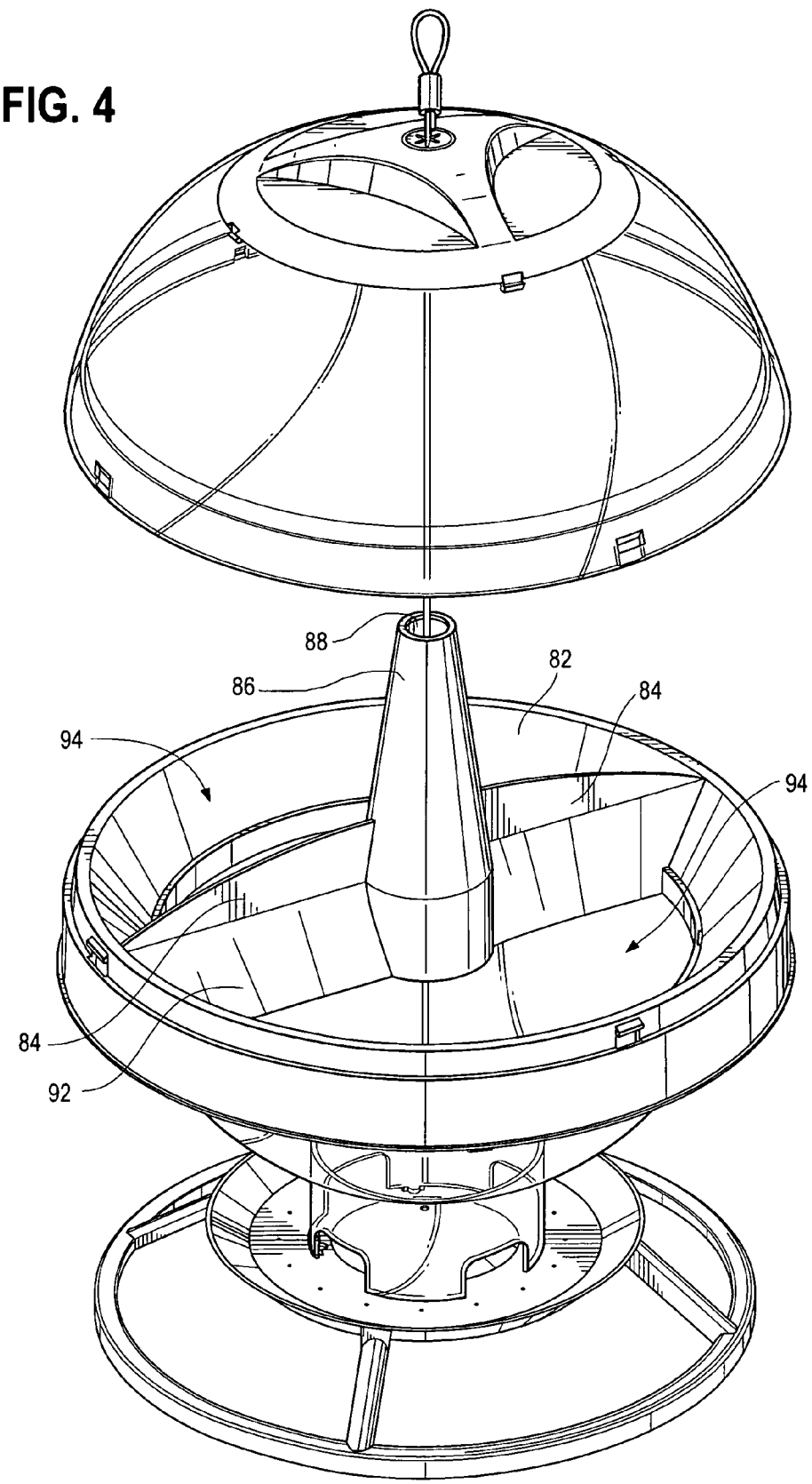
FIG. 4 is an exploded perspective view of an alternate embodiment of the wild bird feeder.

Inside the collar 22 there is comprised an inner wall 82 that supports a plurality of divider walls 84 separating the collar 22 into a plurality of sections 94. In the preferred embodiment, the plurality of divider walls 84 is four which creates an equal number of plurality of sections 94 of four. Alternatively, the plurality of divider walls 84 may be two, as illustrated in FIG. 4, for creating an equal number of plurality of sections 94 of two. The plurality of divider walls 84 are fixedly secured, at one end, to the inner wall 82. In the preferred embodiment, the plurality of divider walls 84 are integrally molded to the inner wall 82. Alternatively, any other means may be used by a person skilled in the art for fixedly securing the plurality of divider walls 84 to the inner wall 82. At the other end, the plurality of divider walls 84 converge and attach to a shared vertical tube 86. In the preferred embodiment, the vertical tube 86 is centrally located within the collar 22 and bird feeder 10 and comprises a hollow passageway 88 enabling the hanging cable 26 to pass unopposed and directly through the collar 22.

In the preferred embodiment, each of the plurality of divider walls 84 comprises a top portion 90 situated in a vertical orientation and a bottom portion 92 angled inwardly into the plurality of sections 94.

The combination of the dome 20 and the collar 22 provide a width that is sufficiently larger than the hopper 24 to enable the dome 20 to assist in providing a covering means for the birds 34 when the birds 34 are standing on the tray 28 or perched on the perch ring 30. This covering means assists in protecting the birds 34 from the elements such as rain, snow, sun, or otherwise when the birds 34 are feeding.

In the preferred embodiment, the hopper 24 is releaseably attached or fastened to the tray 28 using a coupling means 120, as illustrated in FIG. 2C. The hopper 24 comprises a vertical column 126 having an interior surface 124. Fixedly secured to the interior surface 124 of the vertical column 126 is a lever 136. The lever 136 comprises a ball 122 and a guard 128 fixedly securing the ball 122 to the interior surface 124 and providing a gap 130 between the ball 122 and the interior surface 124. The tray 28 comprises a plate 132 (FIG. 2) having a slotted opening 134. The slotted opening 134 comprises a lever hole 138 and a curved slot 140. The lever hole 138 preferably comprises a combined circular shape corresponding to the shape of the ball 122 and rectangular shape corresponding to the guard 128. Situated on the underside surface 142 of the plate 132 is a nub 144 and an indentation 146.

To use the coupling means 120, the lever 136 is inserted through the lever hole 138 and into the slotted opening 134. As the lever 136 is being inserted through the lever hole 138, the circular shape of the lever hole 138 is aligned with and corresponds to the shape of the ball 122 and the rectangular shape of the lever hole 138 is aligned with and corresponds to the guard 128 enabling the smooth insertion of the lever 136 into the slotted opening 134. Once the lever 136 is inserted through the lever hole 138, the interior surface 124 of the vertical column 126 is then moved through the curved slot 140. As the interior surface 124 is moving through the curved slot 140, the lever 136 is likewise moving along the underside surface 142 of the plate 132. As this occurs, the ball 122 encounters a nub 144 which requires additional pressure to force the ball 122 past the nub 144 to reach the indentation 146. When this occurs, the ball 122 becomes engagingly mated with the indentation 146 and creates a locked position of the lever 136 within the slotted opening 134, as illustrated in FIG. 1C. The engagement of the ball 122 and indentation 146 is preferably in a vertical orientation to one another enabling the more efficient mating of these components. This combination prevents the ball 122 from being easily or accidentally released from the indentation 146 and disturbing the locked position of the lever 136 to the slotted opening 134. Also, when the ball 122 and indentation 146 become engagingly mated, the guard 128 is likewise engagingly mated between curved slot 140 for completing the coupling means 120 and achieving a secure fit between the hopper 24 and the tray 28. When the coupling means 120 is desired to be released, the reverse procedure is followed and the hopper 24 can be releasing from the tray 28.

In the preferred embodiment, this coupling means 120 is used in four equally spaced locations between the hopper 24 and the tray 28 for achieving the most efficient and secure attachment of the hopper 24 to the tray 28. Alternatively, it is contemplated that any number of coupling means 120 may be used by one skilled in the art.

As described in further detail below, the plate 132 also provides a conical shaped cone 148 and a raised outer wall 150. In the preferred embodiment, the conical shaped cone 148 is centrally located within the plate 132 and bird feeder 10 and comprises an eye-hole 152 for enabling the hanging cable 26 to pass unopposed and directly through the conical shaped cone 148 and the plate 132 to a bottom cover 154.

The bottom cover 154 comprises a conical shaped cone 156 and a receptacle 160 (FIG. 1C). In the preferred embodiment, the conical shaped cone 156 comprises an eye-hole 158 for enabling the hanging cable 26 to pass unopposed and directly through the conical shaped cone 156 to a stopper 162 connected to the hanging cable 26. In the preferred embodiment, the stopper 162 may be any component and attached in any means known to one skilled in the art provided that the stopper 162 is sufficiently connected to the hanging cable 26 to support the gravitational pull and weight of the bird feeder 10 when hung.

Upon hanging the bird feeder 10 from a tree branch or, alternatively, from any desired location, the gravitational pull and weight of the bird feeder 10 will force or pull the bird feeder 10 in a downward direction on the hanging cable 26. As this occurs and the hanging cable 26 remains in the hanging position, the bottom cover 154 will be forced to engage with the tray 28. In the preferred embodiment, the conical shaped cone 156 of the bottom cover 154 will be gravitationally mated with the conical shaped cone 148 of the tray 28 which are each substantially identical to one another, as illustrated in FIG. 1C. In this manner, the bird feeder 10 and all of the assembled components are freely hung and suspended as desired.

To fill the bird feeder 10 with bird seed 32 and assuming that all of the components of the bird feeder 10 are assembled as described herein and now illustrated in FIG. 3, the bird feeder 10 may be in the hanging position as hung by the hanging cable 26 from the hanging loop 74 or, alternatively, on a table or other supporting means known to one skilled in the art. If in the hanging position, the cover 16 is then separated from the dome 20 as previously described in conjunction with FIG. 2. Alternatively, if not in the hanging position, the cover 16, the dome 20, and/or the collar 22 may be removed for filling the bird feeder 10. Bird seed 32 can then be poured into the open top 54 of the dome 20. As the bird seed 32 is poured into the dome 20, the bird seed 32 continues through the dome 20 and is separated by the collar 22 through the use of the divider walls 84 redirecting the bird seed 32 into any one or more of the plurality of sections 94. The bird seed 32 then passes through the plurality of sections 94 into the hopper 24. The inwardly angled bottom portion 92 of the divider walls 84 also further directs the bird seed 32 through the plurality of sections 94. Once in the hopper 24, the bird seed 32 is funneled from the hopper 24 into the vertical column 126. In the vertical column 126, the bird seed 32 falls vertically into the conical shaped cone 148. When the bird seed 32 engages the conical shaped cone 148, the conical shaped cone 148 directs the bird seed 32 outwardly toward any one of a plurality of ports 164 for distribution into the tray 28 where the bird seed 32 is made available to the birds 34 for feeding. As more bird seed 32 is poured into the bird feeder 10, the extra bird seed 32 will continue to collect within the bird feeder 10 until the bird feeder 10 becomes completely full, as illustrated in FIG. 1. Alternatively, the bird seed 32 can be filled up to the rim 56 of the dome 20 prior to the attachment of the cover 16 to the dome 20.

In the preferred embodiment, the dome 20, the hopper 24, and vertical column 126 are made of a transparent material or, alternatively, of any non-transparent material desired by one skilled in the art. The birds 34 can then either stand on the perch ring 30 or the raised outer wall 150 of the tray 28 to feed on the bird seed 32 in the tray 28. In the preferred embodiment, the perch ring 30 is fixedly secured to and situated below the tray 28 by arms 166. In this manner, larger birds 34 perched or standing on the perch ring 30 will have less of a distance to reach or bend to feed on the bird seed 32 in the tray 28.

When it becomes necessary to clean the bird feeder 10, the hopper 24 can easily be detached or released from the tray 28. In this manner, if the bird feeder 10 is still in the hanging position, all of the components above the tray 28 can be raised or elevated anywhere along the hanging cable 26. By moving these components of the bird feeder 10 away from the tray 28, this enables easy access to the tray 28 and vertical column 126, if necessary, for cleaning. Also, to aid in the cleaning, the tray 28 may be provided with drain holes 168 for enabling water run off and draining of the tray 28.

Thus, there has been provided Applicant's unique wild bird feeder. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A bird feeder, comprising:
a cover;
a dome having a first rim defining an open top and a second rim defining an open bottom;
a latch affixed to the cover, a latch hole in the first rim providing a chamber, the chamber having an entrance and an opposite end, the latch being received through the latch hole and into the chamber, the cover being rotated laterally forcing the latch to move from the entrance of the chamber to the opposite end of the chamber thereby locking the cover to the first rim of the dome for covering the open top;
a collar having a third rim defining a second open top and a fourth rim defining a second open bottom;
a recessed hole situated adjacent to the second rim of the dome, a ledge extending outwardly from the collar and situated adjacent to the third rim, whereby, when the second rim of the dome is positioned over the third rim of the collar until the recessed hole is aligned with the ledge and, upon pressing the dome against the collar, the ledge is penetrated through the recessed hole thereby releaseably fastening the second rim of the dome to the third rim of the collar;
a hopper having a fifth rim defining a third open top and a sixth rim defining a third open bottom;
a ledge extending outwardly from the collar and situated adjacent to the fourth rim, a recessed hole situated adjacent to the fifth rim of the hopper, whereby, when the fourth rim of the collar is positioned inside the fifth rim of the hopper until the ledge is aligned with the recessed hole and, upon pressing the collar against the hopper, the ledge is penetrated through the recessed hole thereby releaseably coupling the fourth rim of the collar to the fifth rim of the hopper;
a column having a seventh rim defining a fourth open top and an eighth rim defining a fourth open bottom;
the seventh rim of the column fixedly secured to the sixth rim of the hopper;
a base having a top surface and a bottom surface; and
the column having an interior surface and a lever extending inwardly from the interior surface, a lever hole and a curved slot formed in the top surface of the base, the lever being received through the lever hole and into a gap between the top surface and the bottom surface, the column being rotated through the curved slot and laterally forcing the lever to traverse through the gap away from the lever hole thereby coupling the eighth rim of the column to the top surface of the base.

2. The device of claim 1 wherein the lever comprises a guard and a ball, the guard fixedly attached at one end to the interior surface of the column and extending outwardly to the other end where it is fixedly attached to the ball.

3. The device of claim 2 wherein the lever hole has a shape that corresponds to the shape formed by the guard and the ball whereby upon the proper alignment of these shapes the lever is received through the lever hole.

4. The device of claim 3 wherein an indentation is situated within the gap and formed in an underside of the top surface, the crater engagingly mating with the ball for assisting in coupling the column to the top surface of the base.

5. The device of claim 1 and further comprising means for hanging the bird feeder.

6. The device of claim 5 wherein the means for hanging the bird feeder is a cable having a hanging loop at one end and a stopper at the other end, the bird feeder situated between the ends of the cable and having a passageway, the cable passing through the passageway for enabling the bird feeder to be slideably moveable along the cable between the ends.

7. The device of claim 1 and further comprising a plurality of divider walls inside the collar defining a plurality of separate sections.

* * * * *